(12) United States Patent
Murgia Mendizabal et al.

(10) Patent No.: US 11,492,153 B2
(45) Date of Patent: Nov. 8, 2022

(54) HORIZONTAL PACKAGING MACHINE

(71) Applicant: ULMA Packaging Technological Center, S. Coop., Oñati (ES)

(72) Inventors: Aritz Murgia Mendizabal, Oñati (ES); Miguel Angel Ugarte Inza, Oñati (ES)

(73) Assignee: ULMA PACKAGING, S. COOP., Oñati (ES)

( * ) Notice: Subject to any disclaimer, the term of this patent is extended or adjusted under 35 U.S.C. 154(b) by 0 days.

(21) Appl. No.: 17/338,924

(22) Filed: Jun. 4, 2021

(65) Prior Publication Data

US 2021/0403186 A1    Dec. 30, 2021

(30) Foreign Application Priority Data

Jun. 29, 2020    (EP) ..................................... 20382573

(51) Int. Cl.
*B65B 9/13*        (2006.01)
*B65B 41/16*       (2006.01)
*B65B 51/30*       (2006.01)
*B65B 61/06*       (2006.01)

(52) U.S. Cl.
CPC ................ *B65B 9/13* (2013.01); *B65B 41/16* (2013.01); *B65B 51/30* (2013.01); *B65B 61/06* (2013.01)

(58) Field of Classification Search
CPC .. B65B 9/13; B65B 9/10; B65B 41/16; B65B 51/30; B65B 61/06
USPC ........................................................ 53/550
See application file for complete search history.

(56) References Cited

U.S. PATENT DOCUMENTS

| | | | | |
|---|---|---|---|---|
| 3,473,288 A | * | 10/1969 | Yasutaro | B65B 65/04 53/550 |
| 3,890,763 A | * | 6/1975 | Ullman | B65D 71/10 53/442 |
| 4,429,513 A | * | 2/1984 | Beckers | B65B 51/00 53/550 |
| 4,506,488 A | * | 3/1985 | Matt | B65B 57/00 53/550 |

(Continued)

FOREIGN PATENT DOCUMENTS

| | | |
|---|---|---|
| DE | 4022816 A1 | 1/1992 |
| EP | 0461689 A1 | 12/1991 |
| KR | 20190139738 A | 12/2019 |

OTHER PUBLICATIONS

Extended European Search Report received in EP application No. 20382573.2, dated Nov. 2, 2020 (7 pages).

*Primary Examiner* — Dariush Seif
(74) *Attorney, Agent, or Firm* — Edell, Shapiro & Finnan, LLC

(57) ABSTRACT

Disclosed herein is a packaging machine that according to one embodiment includes a rollers block with a plurality of roller assemblies distributed in series along a horizontal longitudinal axis of the machine and a transmission block with a motor and a transmission mechanism configured for transmitting the rotation of the motor to all the roller assemblies. At least one roller assembly is independent of the rest of the roller assemblies, is movable with respect to the transmission block, and is configured for cooperating with the transmission mechanism in an operative position, in which the transmission mechanism transmits the rotation of the motor of the transmission block to the roller assembly.

20 Claims, 7 Drawing Sheets

(56) References Cited

U.S. PATENT DOCUMENTS

| | | | | |
|---|---|---|---|---|
| 4,525,977 A * | 7/1985 | Matt | B65B 9/067 | 53/550 |
| 4,574,566 A * | 3/1986 | Eaves | B65B 9/067 | 53/550 |
| 4,709,537 A * | 12/1987 | Ballestrazzi | B65B 51/26 | 493/193 |
| 4,722,168 A * | 2/1988 | Heaney | B65B 9/067 | 53/550 |
| 4,807,426 A * | 2/1989 | Smith | B29C 66/133 | 53/550 |
| 4,909,018 A * | 3/1990 | Yamamoto | B65B 9/067 | 53/550 |
| 4,965,986 A * | 10/1990 | Klinkel | B65B 9/213 | 53/389.5 |
| 5,125,216 A * | 6/1992 | Redaelli | B65B 57/00 | 53/550 |
| 5,247,781 A * | 9/1993 | Runge | B65B 61/188 | 53/139.2 |
| 5,347,791 A * | 9/1994 | Ginzl | B65B 9/067 | 53/550 |
| 5,371,999 A * | 12/1994 | Hansen | B65B 53/063 | 53/550 |
| 5,417,041 A * | 5/1995 | Hansen | B65B 53/063 | 53/550 |
| 5,444,964 A * | 8/1995 | Hanagata | B29C 65/749 | 53/550 |
| 5,524,420 A * | 6/1996 | Ikuta | B65B 57/12 | 53/550 |
| 5,548,946 A * | 8/1996 | Holub | B29C 66/81431 | 53/550 |
| 5,566,526 A * | 10/1996 | Suga | B65B 9/067 | 53/550 |
| 5,761,878 A * | 6/1998 | Walkiewicz, Jr. | B29C 66/4322 | 156/515 |
| 5,941,052 A * | 8/1999 | Evangelisti | B65B 9/067 | 53/511 |
| 6,729,108 B2 * | 5/2004 | Tsuruta | B29C 66/83221 | 53/550 |
| 7,021,036 B2 * | 4/2006 | Hiramoto | B65B 3/02 | 53/562 |
| 7,730,698 B1 * | 6/2010 | Montano | B29C 66/81422 | 219/244 |
| 8,839,595 B2 * | 9/2014 | Hanten | B65B 25/065 | 53/550 |
| 9,376,225 B2 * | 6/2016 | Tsuruta | B29C 66/4322 | |
| 9,688,431 B2 * | 6/2017 | Maj | B29C 66/1122 | |
| 2002/0189206 A1 * | 12/2002 | Capodieci | B29C 66/4312 | 53/550 |
| 2009/0229228 A1 * | 9/2009 | Sambugaro | B65B 9/06 | 53/550 |
| 2016/0194102 A1 * | 7/2016 | Maj | B65B 9/067 | 156/433 |

\* cited by examiner

HORIZONTAL PACKAGING MACHINE

CROSS-REFERENCE TO RELATED APPLICATIONS

This application relates to and claims the benefit and priority to European Application No. EP20382573.2, filed Jun. 29, 2020.

TECHNICAL FIELD

The present invention relates to horizontal packaging machines.

BACKGROUND

A known type of product packaging machine is a horizontal machine in which a film tube is formed from a generally plastic film. The product to be packaged is housed in the tube, and by performing suitable cutting and sealing actions on the tube, a package with a product inside it is generated.

The packaging machine comprises a film feed device, a film forming device which receives the film from the feeding device and confers to it the tubular shape with two longitudinal ends opposing one another, and sealing means for sealing together said longitudinal ends (sealing commonly known as longitudinal sealing), the film tube thereby being generated.

The machine also comprises sealing and cutting means for making a transverse cut in the film tube and establishing a transverse seal on each side of the cut, such that resulting from this operation the film tube is closed transversely upstream of the cut (with one of the transverse seals) and a package closed downstream of the cut (with the other transverse seal) is obtained independent of the film tube (as a result of the cut).

U.S. Pat. No. 5,347,791 discloses a machine of this type, comprising a sealing rollers block to perform longitudinal sealing. The sealing rollers block comprises a plurality of roller assemblies distributed in series along the horizontal path of the film tube, and means for causing the actuation of said assemblies. Said means comprise a motor and a mechanism for transmitting the rotation of the motor to all the roller assemblies. Each roller assembly comprises a shaft connected to the mechanism of said means and a transmission assembly transmitting the rotation of the shaft to two opposing rollers between which the opposing longitudinal ends of the tubular-shaped film move forward. The mechanism comprises a respective wheel for each roller assembly, fixed to the shaft of the corresponding roller assembly, and a belt associated with the motor and with said wheels, whereby the rotation of the motor is transmitted to said wheels and from these wheels to the shaft of the roller assemblies.

SUMMARY

Disclosed is a horizontal packaging machine.

The horizontal packaging machine comprises a sealing rollers block and a frame. The sealing rollers block comprises a plurality of roller assemblies distributed in series along a horizontal longitudinal axis of the machine and a transmission block attached to the frame and comprising at least one motor and a transmission mechanism configured for transmitting the rotation of the motor to all the roller assemblies.

Each roller assembly comprises two opposing rollers, one on each side of the longitudinal axis of the machine, and a transmission assembly for transmitting the rotation of the motor to opposing rollers. At least the opposing rollers of one of said roller assemblies are configured for sealing together two superimposing films or two opposing longitudinal ends of one and the same tubular-shaped film, when said films or ends are moved through said rollers.

At least one roller assembly is independent of the rest of the roller assemblies and movable with respect to the transmission block along a determined path, said movable roller assembly being configured for cooperating with the transmission mechanism in an operative position in which said transmission mechanism transmits the rotation of the motor of the transmission block to said movable roller assembly as a result of said cooperation, and for abandoning said operative position or being arranged in said operative position by means of said movement.

The transmission mechanism comprises a transmission gear wheel rotating together with the motor of the transmission block, the transmission assembly of the movable roller assembly comprising a gear wheel which, with said roller assembly in the operative position, cooperates with the transmission gear wheel of said transmission mechanism.

The machine comprises a structure with a structure segment configured for supporting the movable roller assembly, and a blocking device configured for impeding the movement of the movable roller assembly when said movable roller assembly is in the operative position.

Therefore, when said movable roller assembly requires being changed, or when required for machine maintenance and/or cleaning tasks, for example, said movable roller assembly can be removed from the machine in a simple manner, without this action requiring acting on the rest of the roller assemblies, or affecting the rest of the roller assemblies, which may even continue to operate once said movable roller assembly is removed from the machine, should this be required.

The fact that the roller assembly is movable does not affect the safe operation thereof, because it is kept securely blocked in the operative position. It is thereby achieved a more versatile and productive packaging machine capable, for example, of generating packages from different types of films having different properties, as it allows the sealing rollers block to be adapted for each type of film in a quick and simple manner (and for each type of package), replacing one movable roller assembly with another movable roller assembly adapted for working with said type of film, instead of substituting the entire sealing rollers block or the opposing rollers of the roller assemblies one by one, which would further require more complex and more time-consuming operations.

Additionally, the machine is more ergonomic as it allows the movable roller assembly to be independently handled and to be out of the operative position (for example outside the machine, instead of having to handle the entire sealing rollers block, which is bulkier and heavier, and requires external means to help remove them from the packaging machine, or instead of having to individually handle each of the opposing rollers of said sealing block in the packaging machine itself with the rest of the machine elements around same. In the machine, shutdown times are also reduced as swapping a first movable roller assembly for a second movable roller assembly, equivalent to the first roller assembly, during maintenance and/or cleaning tasks for said first movable roller assembly, which allows the machine to be kept operative by means of said second movable roller assembly, unlike what occurs with machines from the state of the art in which the machine must be shut down at all times during said tasks.

These and other advantages and features will become apparent in view of the figures and the detailed description.

DETAILED DESCRIPTION

Figure 1:
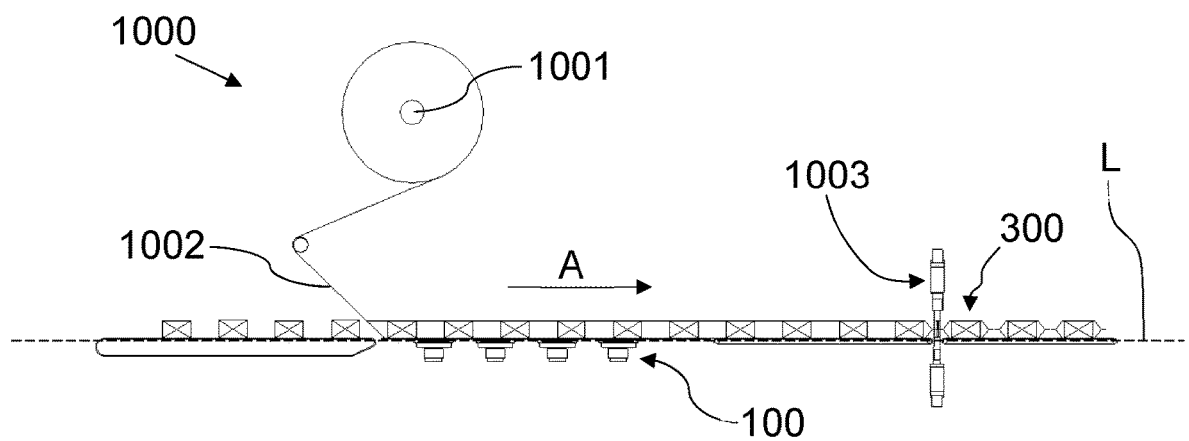
FIG. 1 schematically shows a simplified side view of a horizontal packaging machine according to one embodiment.

FIG. 1 depicts an embodiment of a horizontal packaging machine 1000, comprising a horizontal longitudinal axis L and a frame (not depicted in the figures).

The machine 1000 comprises a film feed device 1001 for supplying a film 1002 with which packages 300 are generated, and a forming tool not depicted in the figures, imparting a tubular shape to the film 1002. The tubular-shaped film 1002 is supplied horizontally (moving forward in a forward movement direction A), with the products to be packaged inside the same. When the tubular shape is imparted to the film 1002, said tubular-shaped film 1002 comprises two opposing longitudinal ends, and the machine 1000 comprises a sealing rollers block 100 configured for sealing together these ends such that a film tube is generated. The machine 1000 further comprises a transverse sealing and cutting tool 1003 for transversely cutting the film tube and establishing a transverse seal on each side of the cut (preferably simultaneously to the cut being made), such that a film tube closed at a longitudinal end is obtained on one side of the cut and a package 300 with a product packaged inside same is obtained on the other side of the cut.

Figure 2:
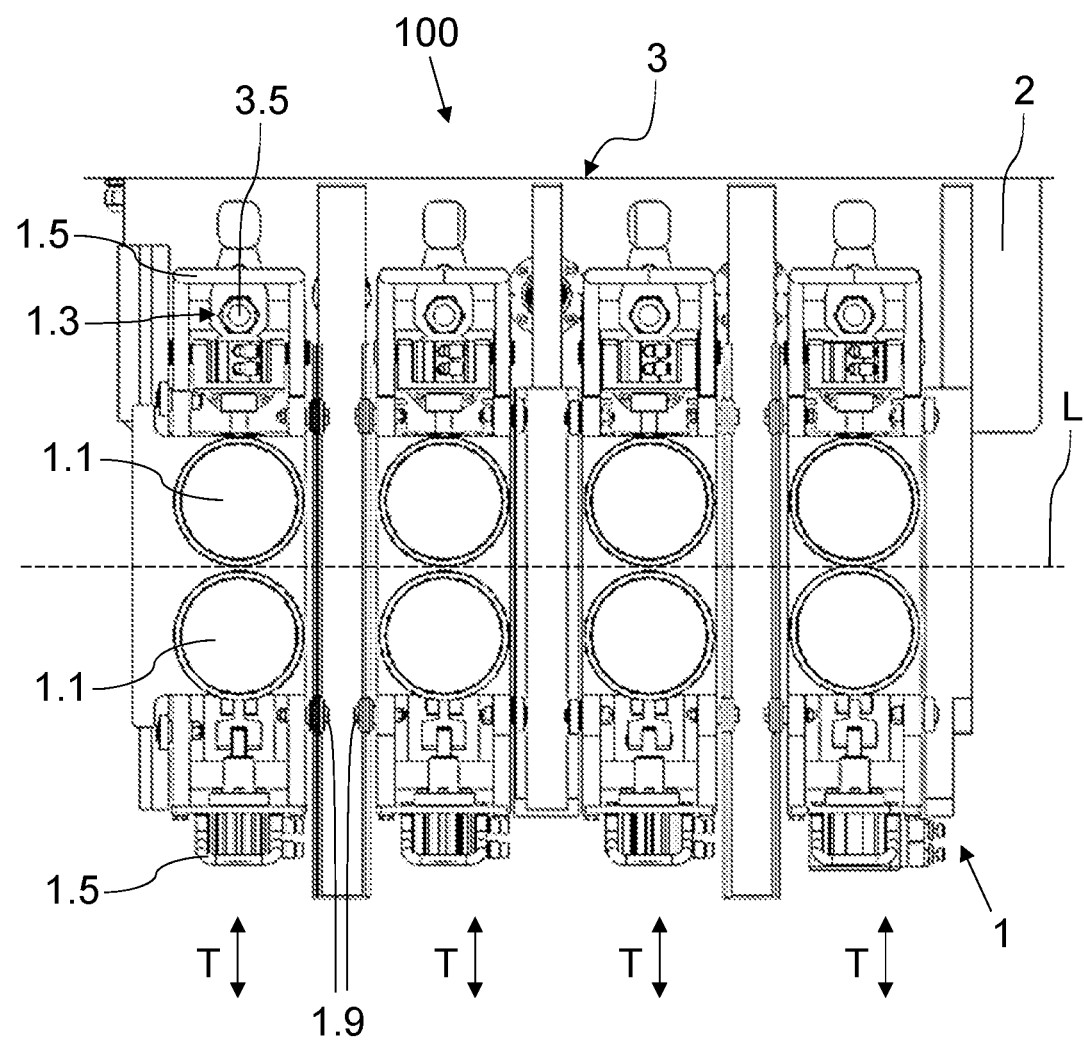
FIG. 2 shows a plan view of a sealing rollers block of the horizontal packaging machine according to one embodiment.
Figure 3:
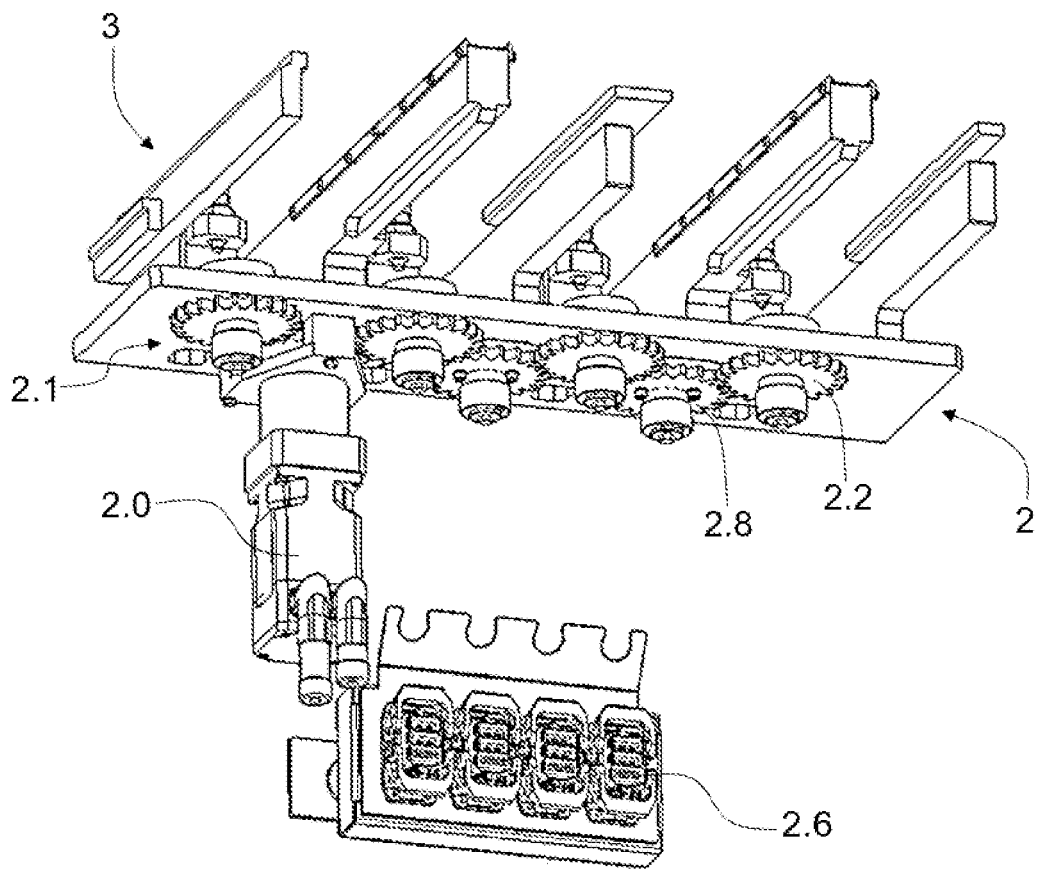
FIG. 3 is a bottom perspective view showing a transmission block of an embodiment of the horizontal packaging machine.

The sealing rollers block 100 comprises a plurality of roller assemblies 1 distributed in series along a horizontal longitudinal axis L of the machine 1000, and a transmission block 2 attached to the frame of said machine 1000, as depicted in FIG. 2. The transmission block 2 comprises at least one motor 2.0 and a transmission mechanism 2.1, as depicted in FIG. 3, the transmission mechanism 2.1 being configured for transmitting the rotation of the motor 2.0 to all the roller assemblies 1.

Figure 4:
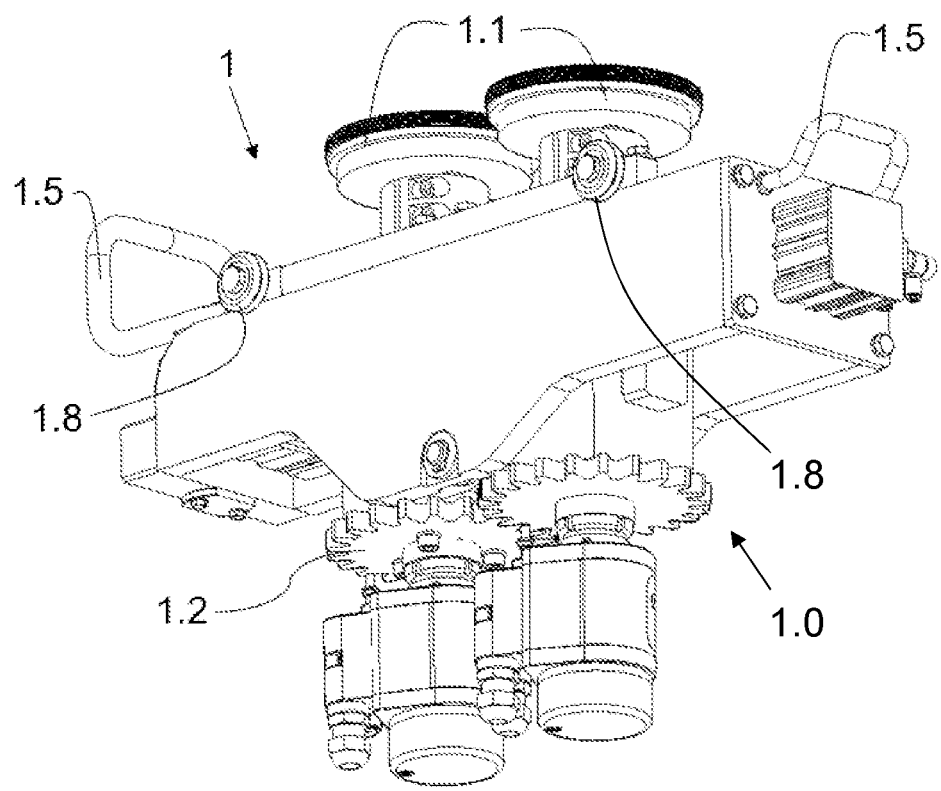
FIG. 4 shows a simplified perspective view of a roller assembly of an embodiment of the horizontal packaging machine, without a connection cable, without a connector, and without a lower guard.
Figure 5:
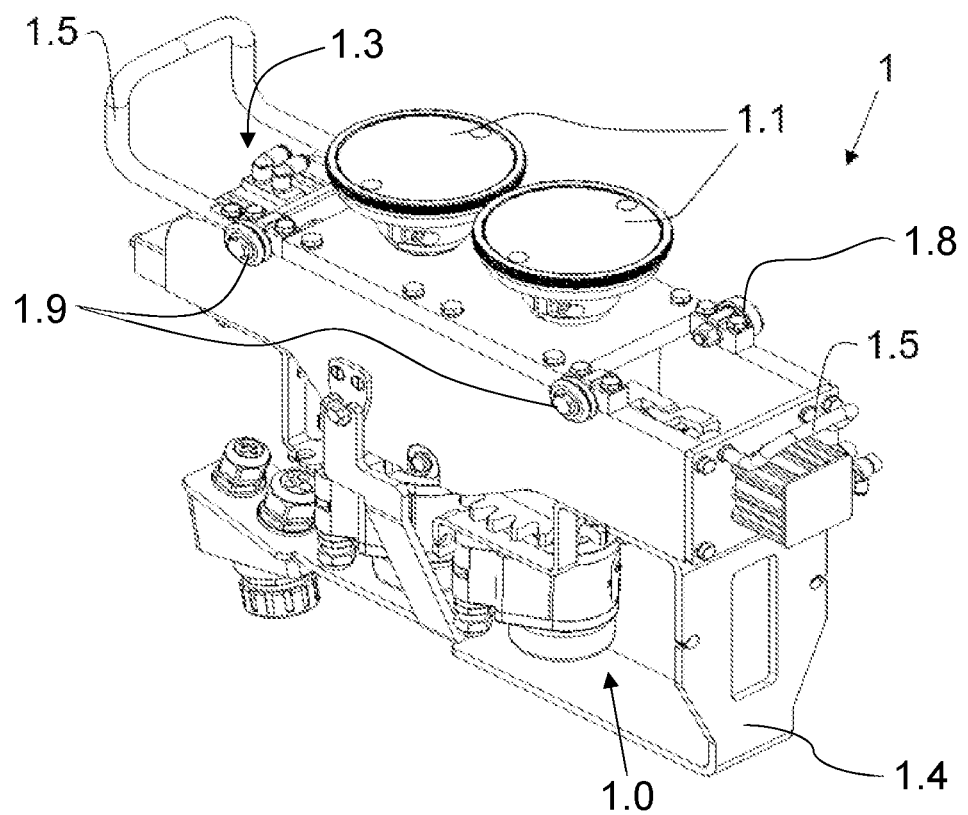
FIG. 5 shows another perspective view of the roller assembly of FIG. 4, with the lower guard.

As shown in FIGS. 4 and 5, each roller assembly 1 comprises two opposing rollers 1.1, arranged such that the longitudinal ends of the tubular-shaped film 1002 passes between them when moved in the forward movement direction A (one on each side of the longitudinal axis L of the machine 1000). Each roller assembly 1 further comprises a transmission assembly 1.0 for transmitting the rotation of the motor 2.0 to its two opposing rollers 1.1, said transmission assembly 1.0 being configured for causing a simultaneous rotation in opposite directions of said two rollers 1.1, such that the surface of said opposing rollers 1.1 contacting the film 1002 rotates in the sense of the forward movement direction A of the film 1002. At least one roller assembly 1 is configured for generating or participating in the sealing of the longitudinal ends of the tubular-shaped film 1002, said roller assembly 1 preferably comprising heating means for heating the surfaces of said rollers 1.1 contacting said ends of the film 1002 when said ends of the film 1002 are moved through said rollers 1.1 for participating in said sealing, said heating means preferably being electric resistors, or said roller assembly 1 alternatively comprising ultrasonic welding means.

At least one roller assembly 1 is independent of the rest of the roller assemblies 1 and movable with respect to the transmission block 2 along a determined path T. Preferably, the roller assembly 1 configured for establishing the seal is movable. Said movable roller assembly 1 is configured for cooperating with the transmission mechanism 2.1 in an operative position in which said transmission mechanism 2.1 transmits the rotation of the motor 2.0 to said movable roller assembly 1 as a result of said cooperation, and for abandoning said operative position or being arranged in said operative position by means of said movement.

The transmission mechanism 2.1 comprises a transmission gear wheel 2.2 rotating together with the motor 2.0 of the transmission block 2, and the transmission assembly 1.0 of the movable roller assembly 1 comprises a gear wheel 1.2 which, with said roller assembly 1 in the operative position, cooperates with the transmission gear wheel 2.2 of said transmission mechanism 2.1. This cooperation causes the rotation of the motor 2.0 to be transmitted to the gear wheel 1.2 of the transmission assembly 1.0 through the transmission gear wheel 2.2.

The machine 1000 comprises a structure 3 with a structure segment 3.0 configured for supporting the movable roller assembly 1, and a blocking device 3.5 configured for blocking the movable roller assembly 1 (impeding the movement thereof) when said movable roller assembly 1 is in the operative position, such that said roller assembly 1 securely performs its function despite being movable.

The movable roller assembly 1 comprises a blocking area 1.3 configured for cooperating with the blocking device 3.5 when said roller assembly 1 is in its operative position. The blocking area 1.3 comprises an opening, and the blocking device 3.5 comprises a rod which, when introduced in said opening, impedes the movement of said roller assembly 1 and therefore blocks said movable roller assembly 1 in the operative position. The blocking device 3.5 preferably further comprises an accessible, movable actuator attached to the rod of said blocking device 3.5, such that when said actuator is moved (by an operator, for example), it causes said rod to be discharged from the opening of the blocking area 1.3, said roller assembly 1 which could already be moved on the determined path T being released. The blocking device 3.5 further comprises a spring which is expanded when the rod is housed in the opening of the blocking area 1.3, and contracted when the actuator is actuated for discharging the rod blocking device 3.5 from said opening.

Figure 6:
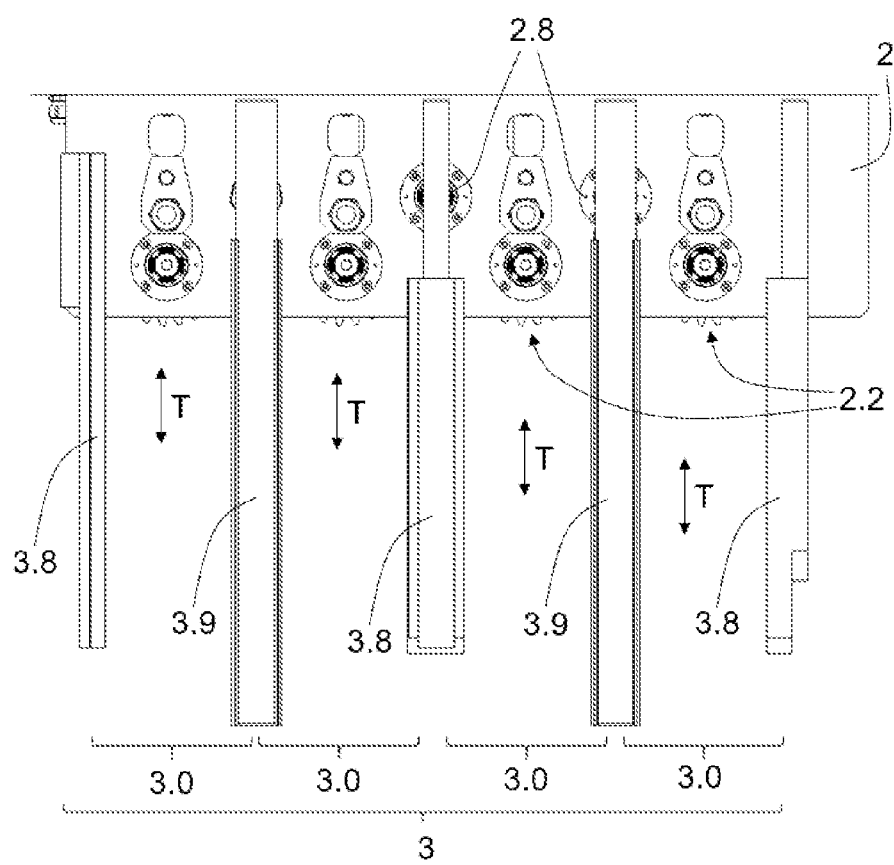
FIG. 6 shows a plan view of a structure of the frame of an embodiment of the horizontal packaging machine.

The structure 3 of the frame comprises a structure segment 3.0 configured for supporting the movable roller assembly 1, as depicted in FIG. 6, such that said structure segment 3.0 is configured for guiding the movement of said movable roller assembly 1 along its determined path T. Preferably, if said determined path T is linear and transverse to the longitudinal axis L of the machine 1000, the transmission gear wheel 2.2 and the gear wheel 1.2 of the roller assembly 1 is aligned on said determined path T, when said roller assembly 1 is supported in the corresponding structure segment 3.0.

The movable roller assembly 1 preferably comprises a first support 1.9 on one of its sides and a second support 1.8 on the opposite side, the structure segment 3.0 preferably comprising, associated therewith, a first guide surface 3.9 for the first support 1.9 and a second guide surface 3.8 for the second support 1.8, said guide surfaces 3.8 and 3.9, preferably being parallel to one another. Each guide surface 3.8 and 3.9 is configured for cooperating with the corresponding support 1.8 and 1.9, such that the movement of said movable roller assembly 1 is guided with said cooperation along the determined path T.

In some embodiments, the first support 1.9 of the roller assembly 1 is a wheel with a projection and the first guide surface 3.9 associated with said first support 1.9 comprises a slot extending parallel to the corresponding determined path T and being configured for holding the projection of the wheel of said first support 1.9. In other embodiments, the first support 1.9 is a wheel with a slot and the first guide surface 3.9 comprises a projection extending parallel to the corresponding determined path T and being configured for being housed in the slot of the wheel of said first support 1.9.

In some embodiments, the second support 1.8 of the movable roller assembly 1 comprises a wheel with a smooth outer surface and the second guide surface 3.8 is a smooth surface.

In some embodiments, at least one of the first supports 1.9 and/or second supports 1.8 of the movable roller assembly 1 comprises an adjustable eccentric shaft adapted for, with the adjustment thereof, arranging said movable roller assembly 1 aligned with the longitudinal axis L, making it easier to correctly position the movable roller assembly 1 in the operative position.

Preferably, when the movable roller assembly 1 is supported in the structure segment 3.0 the associated transmission gear wheel 2.2 and the gear wheel 1.2 of said roller assembly 1 are aligned on the determined path T when said roller assembly 1 is supported in the corresponding structure segment 3.0, which makes it easier for them to cooperate when said roller assembly 1 is arranged in the operative position.

In some embodiments, the structure segment 3.0 is configured for guiding the movement of said roller assembly 1 on the determined path T, said path T being a horizontal path perpendicular to the longitudinal axis L of the machine 1000, such that the determined path T is linear and transverse to the longitudinal axis L of the machine 1000.

In some embodiments, the sealing rollers block 100 comprises a plurality of roller assemblies 1 that are independently movable with respect to the transmission block 2, said roller assemblies 1 being configured for being moved with respect to the transmission block 2 along a respective determined path T, all the determined paths T being parallel to one another. The transmission mechanism 2.1 comprises a respective transmission gear wheel 2.2 for each movable roller assembly 1, and preferably, the transmission gear wheels 2.2 are identical and aligned with one another with respect to the longitudinal axis L of the machine 1000 (the center of all the transmission gear wheels 2.2 are aligned with respect to an axis which is parallel to the longitudinal axis L).

Furthermore, the transmission mechanism 2.1 comprises at least one transition gear wheel 2.8 arranged between every two contiguous transmission gear wheels 2.2, each transition gear wheel 2.8 being configured for cooperating with two transmission gear wheels 2.2. Therefore, since the transmission gear wheels 2.2 and the transition wheels 2.8 cooperate with one another, imparting the rotation of the motor 2.0 to one of them is enough to cause the joint rotation of all the others and, as a result, all the rollers 1.1 of the movable roller assemblies 1 arranged in the operative position rotate. The motor 2.0 could therefore be coupled to one of the transmission gear wheels 2.2, one of the transition wheels 2.8, or even to an additional wheel which would in turn be arranged such that it would cooperate with one of the transmission gear wheels 2.2 or one of the transition wheels 2.8.

Figure 7:
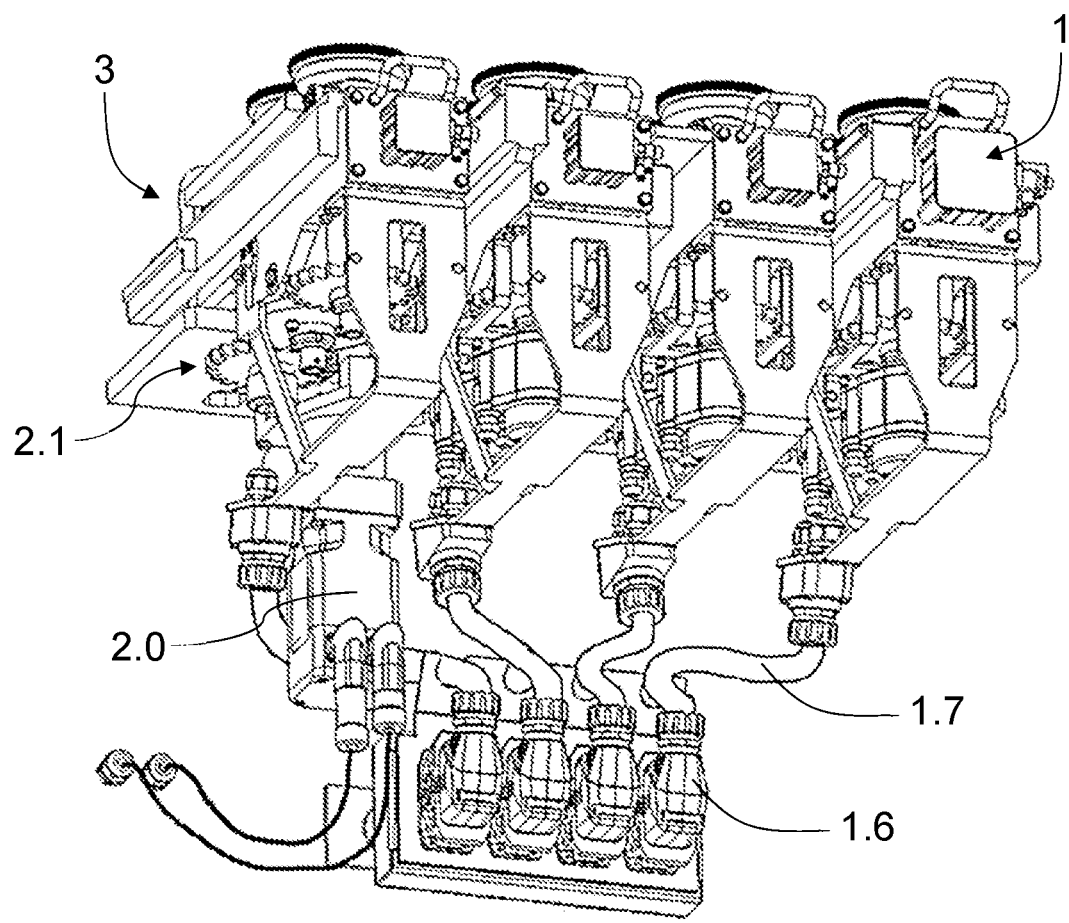
FIG. 7 shows the transmission block of FIG. 4, with the corresponding roller assemblies in the operative position.

The movable roller assembly 1 is configured for being powered and comprises a connector 1.6 through which it receives the necessary supply, said supply preferably being electrical and/or pneumatic. In this case, the roller assembly 1 comprises a connection cable 1.7 shown in FIG. 7, for attaching the connector 1.6 to wherever said roller assembly 1 so requires it. For example, in the case of a roller assembly 1 configured for sealing, said roller assembly 1 requires an electric power supply for heating the surface of its rollers 1.1 in contact with the longitudinal ends of the tubular-shaped film 1002, or for powering a sonotrode associated with at least one of its rollers 1.1, for example. A movable roller assembly 1 may comprise a pneumatic actuator the actuation of which causes the rollers 1.1 thereof to separate so as to allow the film 1002 to be handled, if needed, requiring a pneumatic power supply. In some cases, a roller assembly 1 may require both power supplies. The frame or the transmission block 2 comprises a connector 2.6 complementary to the connector 1.6 of the roller assembly 1.

Each movable roller assembly 1 may comprise at least one handle 1.5 for being actuated and making it easier to be moved along the corresponding determined path T, and may also comprise a lower guard 1.4 for protecting the elements of said movable roller assembly 1, which enables supporting said roller assembly 1 on the lower guard 1.4, for example, if needed.

Embodiments of the invention are also disclosed in the following clauses.

Clause 1. Horizontal packaging machine comprising a sealing rollers block (100) and a frame, the sealing rollers block (100) comprising a plurality of roller assemblies (1) distributed in series along a horizontal longitudinal axis (L) of the machine (1000) and a transmission block (2) attached to the frame and comprising at least one motor (2.0) and a transmission mechanism (2.1) configured for transmitting the rotation of the motor (2.0) to all the roller assemblies (1), each roller assembly (1) comprising two opposing rollers (1.1), one on each side of the longitudinal axis (L) of the machine (1000), and a transmission assembly (1.0) for transmitting the rotation of the motor (2.0) to its two rollers (1.1), and the two rollers (1.1) of at least one of said roller assemblies (1) being configured for sealing together two superimposing films or two opposing longitudinal ends of one and the same tubular-shaped film (1002), when said films or ends are moved through said rollers (1.1), at least one roller assembly (1) is independent of the rest of the roller assemblies (1) and movable with respect to the transmission block (2) along a determined path (T), said movable roller assembly (1) being configured for cooperating with the transmission mechanism (2.1) in an operative position in which said transmission mechanism (2.1) transmits the rotation of the motor (2.0) of the transmission block (2) to said movable roller assembly (1) as a result of said cooperation, and for abandoning said operative position or being arranged in said operative position by means of said movement, the transmission mechanism (2.1) comprising a transmission gear wheel (2.2) rotating integrally with the motor (2.0) of the transmission block (2), and the transmission assembly (1.0) of the movable roller assembly (1) comprising a gear wheel (1.2) which, with said roller assembly (1) in the operative position, cooperates with the transmission gear wheel (2.2) of said transmission mechanism (2.1), the machine (1000) comprising a structure (3) with a structure segment (3.0) configured for supporting the movable roller assembly (1), and a blocking device (3.5) configured for impeding the movement of the movable roller assembly (1) when said movable roller assembly (1) is in the operative position.

Clause 2. Horizontal packaging machine according to clause 1, wherein the movable roller assembly (1) comprises a blocking area (1.5) configured for cooperating with the blocking device (3.5) when said movable roller assembly (1) is in its operative position, said blocking area (1.5) comprising an opening and the blocking device (3.5) comprising a rod which, when introduced in said opening, impedes the movement of said movable roller assembly (1) and therefore blocks said movable roller assembly (1) in the operative position.

Clause 3. Horizontal packaging machine according to clause 2, wherein the blocking device (3.5) comprises an accessible, movable actuator attached to the rod of said blocking device (3.5), such that when said actuator is moved, it causes said rod to be discharged from the opening of said blocking area (1.5), said roller assembly (1) being released.

Clause 4. Horizontal packaging machine according to any of clauses 1 to 3, wherein the structure segment (3.0) of the structure (3) is configured for guiding the movement of said movable roller assembly (1) along its determined path (T).

Clause 5. Horizontal packaging machine according to clause 4, wherein the movable roller assembly (1) comprises a first support (1.9) on one of its sides and a second support (1.8) on the opposite side, the corresponding structure segment (3.0) comprising a first guide surface (3.9) for the first support (1.9) of said roller assembly (1) and a second surface (3.8) for the second support (1.8) of said roller assembly (1), said guide surfaces (3.8, 3.9) being configured for cooperating with the corresponding support (1.8, 1.9) such that the movement of said movable roller assembly (1) is guided with said cooperation along the determined path (T).

Clause 6. Horizontal packaging machine according to clause 5, wherein the first support (1.9) of the movable roller assembly (1) is a wheel with a projection and the first guide surface (3.9) comprises a slot extending parallel to the determined path (T) and being configured for housing the projection of the wheel of said first support (1.9), or wherein the first support (1.9) of the movable roller assembly (1) is a wheel with a slot and the first guide surface (3.9) comprises a projection extending parallel to the corresponding determined path (T) and being configured for being housed in the slot of the wheel of said first support (1.9).

Clause 7. Horizontal packaging machine according to clause 5 or 6, wherein the second support (1.8) of the movable roller assembly (1) comprises a wheel with a smooth outer surface and the second guide surface (3.8) of the corresponding structure segment (3.0) is a smooth surface.

Clause 8. Horizontal packaging machine according to any of clauses 5 to 7, wherein at least one of the supports (1.8, 1.9) of the movable roller assembly (1) comprises an adjustable eccentric shaft adapted for, with the adjustment thereof, arranging said movable roller assembly (1) aligned with the longitudinal axis (L).

Clause 9. Horizontal packaging machine according to any of clauses 5 to 8, wherein the transmission gear wheel (2.2) and the gear wheel (1.2) of the associated roller assembly (1) are aligned on the determined path (T) when said roller assembly (1) is supported in the corresponding structure segment (3.0).

Clause 10. Horizontal packaging machine according to any of clauses 1 to 9, wherein the determined path (T) is a horizontal path perpendicular to the longitudinal axis (L) of the machine (1000).

Clause 11. Horizontal packaging machine according to any of clauses 1 to 10, wherein the sealing rollers block (100) comprises a plurality of roller assemblies (1) that are independently movable with respect to the transmission block (2), said roller assemblies (1) being configured for being moved with respect to the transmission block (2) along a respective determined path (T), all the determined paths (T) being parallel to one another, the transmission mechanism (2.1) of the transmission block (2) comprising a respective transmission gear wheel (2.2) for each movable roller assembly (1).

Clause 12. Horizontal packaging machine according to clause 11, wherein the transmission gear wheels (2.2) are aligned with one another with respect to the longitudinal axis (L) of the machine (1000), and wherein the transmission mechanism (2.1) comprises at least one transition gear wheel (2.8) arranged between every two contiguous transmission gear wheels (2.2), said transition gear wheel (2.8) being configured for cooperating with said two transmission gear wheels (2.2).

Clause 13. Horizontal packaging machine according to clause 12, wherein the motor (2.0) is coupled to a transmission gear wheel (2.2) or to a transition gear wheel (2.8).

Clause 14. Horizontal packaging machine according to clause 12, wherein the transmission block (2.1) comprises an additional wheel coupled to the motor (2.0) and coupled to a transmission gear wheel (2.2) or to a transition gear wheel (2.8).

Clause 15. Horizontal packaging machine according to any of clauses 1 to 14, wherein the movable roller assembly (1) is configured for being powered and comprises a connector (1.6) through which it receives the necessary supply, said supply preferably being electrical and/or pneumatic, the frame or the transmission block (2) comprising a connector (2.6) complementary to the connector (1.6) of the roller assembly (1).

What is claimed is:
1. A horizontal packaging machine in which packages are formed from a tubular-shaped film having first and second opposing longitudinal ends, the packages being formed as the tubular-shaped film is moved in a forward movement direction, the horizontal packaging machine comprising:
a frame structure including a structure segment;
a sealing rollers block including first and second roller assemblies distributed in series along a length of the horizontal packaging machine, each of the first and second roller assemblies including first and second opposing rollers that are configured to grip between them the first and second opposing longitudinal ends of the tubular-shaped film and to seal together the first and second opposing longitudinal ends as the first and second opposing longitudinal ends move across the first and second opposing rollers, each of the first and second roller assemblies including a transmission assembly;

a transmission block coupled to the frame and including a motor operatively coupled to a transmission mechanism that is configured to cooperate with the transmission assembly of each of the first and second roller assemblies to transmit a rotation of the motor to the respective first and second rollers, the first roller assembly being independent of the second roller assembly and moveable with respect to the transmission block along a first predetermined path;

the first roller assembly being independently movable between an operative position and a non-operative position, in the operative position the transmission mechanism of the transmission block cooperates with the transmission assembly of the first roller assembly, in the non-operative position the transmission assembly of the first roller assembly is positioned away from the transmission mechanism such that the rotation of the motor is not transmitted to the first and second rollers of the first roller assembly;

the transmission mechanism of the transmission block including a first transmission gear wheel that is operatively coupled to the motor such that the first transmission gear wheel rotates when the motor rotates, the transmission assembly of the first roller assembly including a first gear wheel that cooperates with the first transmission gear wheel when the first roller assembly is in the operative position;

the structure segment being configured to support the first roller assembly when the first roller assembly moves between the operative and non-operative positions.

2. The horizontal packaging machine according to claim 1, further comprising a blocking device that is configured to prevent movement of the first roller assembly away from the operative position when the first roller assembly is in the operative position.

3. The horizontal packaging machine according to claim 2, wherein the first roller assembly comprises a blocking area configured to cooperate with the blocking device when the first roller assembly is in the operative position, the blocking area comprising an opening and the blocking device comprising a rod that when introduced in the opening prevents movement of the first roller assembly away from the operative position.

4. The horizontal packaging machine according to claim 3, further comprising an actuator coupled to the rod, the actuator configured to move the rod into and out of the opening.

5. The horizontal packaging machine according to claim 1, wherein the structure segment is configured to guide the movement of the first roller assembly along the determined path.

6. The horizontal packaging machine according to claim 5, wherein the first roller assembly includes a first side and a second side opposite the first side, the first side of the first roller assembly including a first support and the second side of the first roller assembly including a second support, the structure segment including first and second surfaces on which the first and second supports respectively move when the first roller assembly is moved between the operative position and the non-operative position.

7. The horizontal packaging machine according to claim 6, wherein the first support and the first surface of the structure segment are configured to cooperate with one another such that the movement of first roller assembly is guided along the determined path.

8. The horizontal packaging machine according to claim 7, wherein the first support is a wheel with a projection and the first surface of the structure segment comprises a slot extending parallel to the determined path, the slot being configured to house the projection of the wheel.

9. The horizontal packaging machine according to claim 7, wherein the first support is a wheel with a slot and the first surface of the structure segment comprises a projection extending parallel to the determined path, the slot being configured to house the projection.

10. The horizontal packaging machine according to claim 8, wherein the second support of the first roller assembly comprises a wheel with a smooth outer surface and the second surface of the structure segment is a smooth surface.

11. The horizontal packaging machine according to claim 9, wherein the second support of the first roller assembly comprises a wheel with a smooth outer surface and the second surface of the structure segment is a smooth surface.

12. The horizontal packaging machine according to claim 1, wherein the first predetermined path is a horizontal path perpendicular to the forward movement direction.

13. The horizontal packaging machine according to claim 1, wherein the second roller assembly is independently moveable between an operative position and a non-operative position, when the second roller assembly is in the operative position the transmission mechanism of the transmission block cooperates with the transmission assembly of the second roller assembly, when the second roller assembly is in the non-operative position the transmission assembly of the second roller assembly is positioned away from the transmission mechanism such that the rotation of the motor is not transmitted to the first and second rollers of the second roller assembly.

14. The horizontal packaging machine according to claim 13, wherein the transmission mechanism of the transmission block includes a second transmission gear wheel that is operatively coupled to the motor such that the second transmission gear wheel of the transmission mechanism rotates when the motor rotates, the transmission assembly of the second roller assembly including a second gear wheel that cooperates with the second transmission gear wheel of the transmission mechanism when the second roller assembly is in the operative position.

15. The horizontal packaging machine according to claim 14, wherein the first transmission gear wheel and the second transmission gear wheel are aligned on the determined path when the first roller assembly is supported by the structure segment.

16. The horizontal packaging machine according to claim 14, wherein the first and second transmission gear wheels of the transmission mechanism are aligned with one another with respect to the forward movement direction, the transmission mechanism further comprising a transition gear wheel arranged between the first and second transmission gear wheels, the transition gear wheel being configured to cooperate with each of the first and second transmission gear wheels.

17. The horizontal packaging machine according to claim 16, wherein the motor is coupled to one of the first and second transmission gear wheels or to the transition gear wheel.

18. The horizontal packaging machine according to claim 16, wherein the transmission mechanism of the transmission block includes a third transmission gear wheel that is coupled to the motor and to at least one of the first and second transmission gear wheels or is coupled to the motor and the transition gear wheel.

19. The horizontal packaging machine according to claim 1, wherein the determined path is a linear path.

20. The horizontal packaging machine according to claim 14, wherein the second roller assembly is movable with respect to the transmission block along a second predetermined path when the second roller assembly moves between the operative and non-operative positions, the second predetermined path being non-parallel to the forward movement direction.

\* \* \* \* \*